Oct. 9, 1962  L. B. LOANE  3,057,663
LOAD-CARRYING APPARATUS
Filed Sept. 8, 1960  3 Sheets-Sheet 2
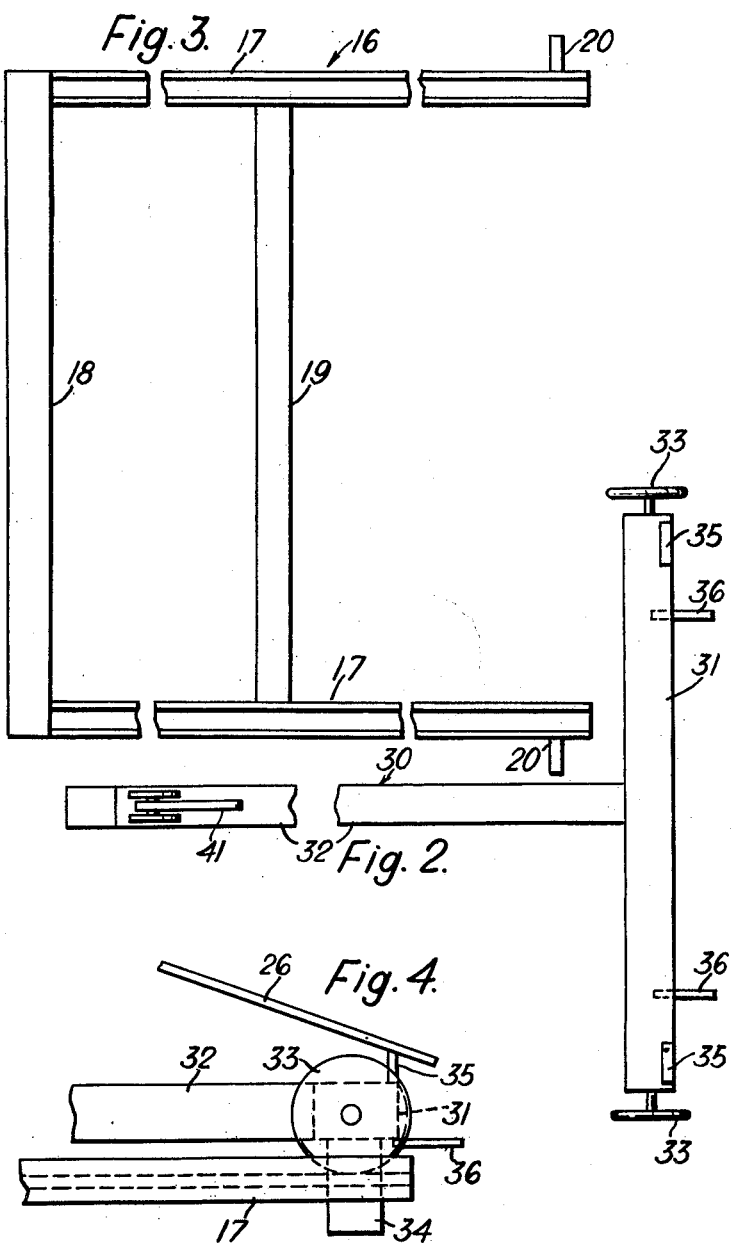
LANCELOT BARTON LOANE
Inventor.

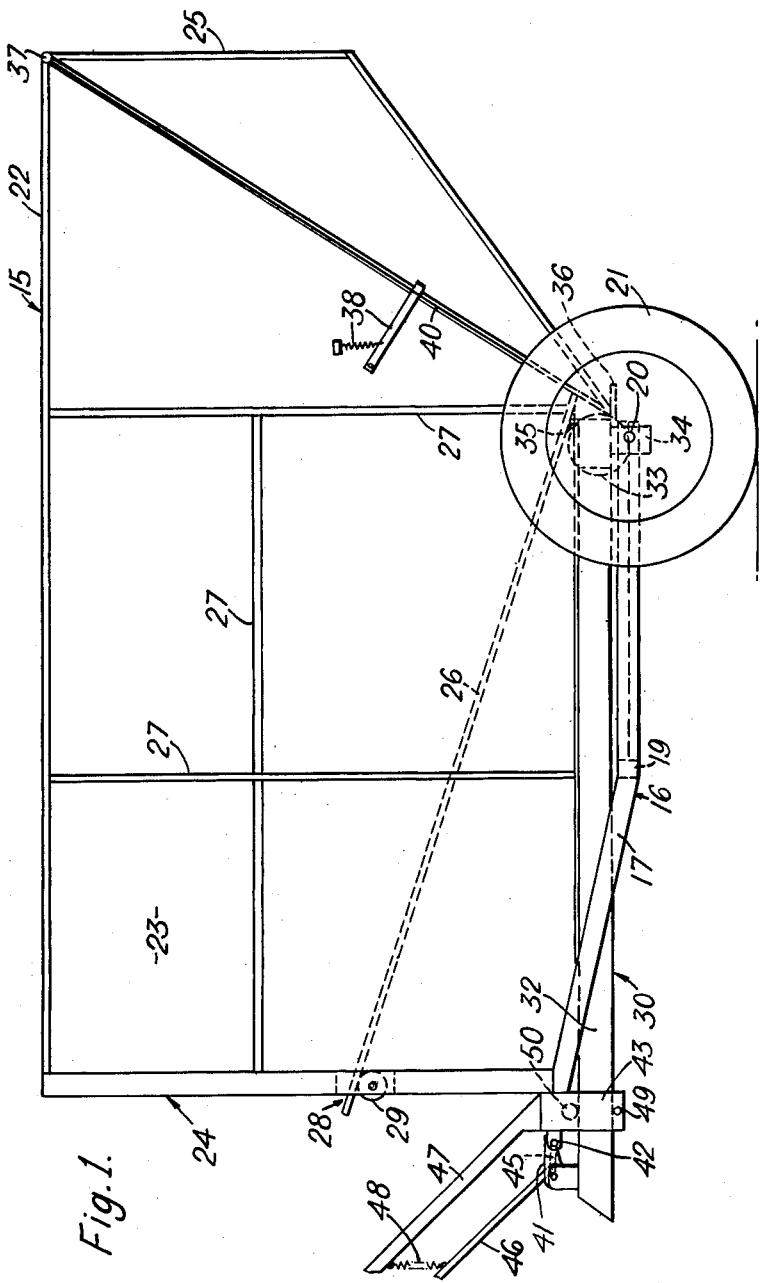

Oct. 9, 1962 L. B. LOANE 3,057,663
LOAD-CARRYING APPARATUS
Filed Sept. 8, 1960 3 Sheets-Sheet 3
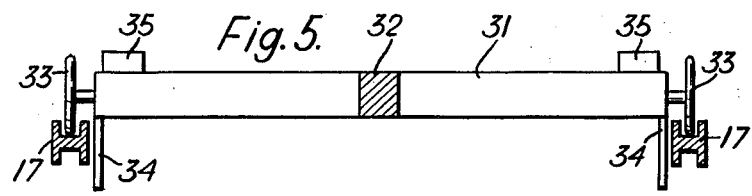
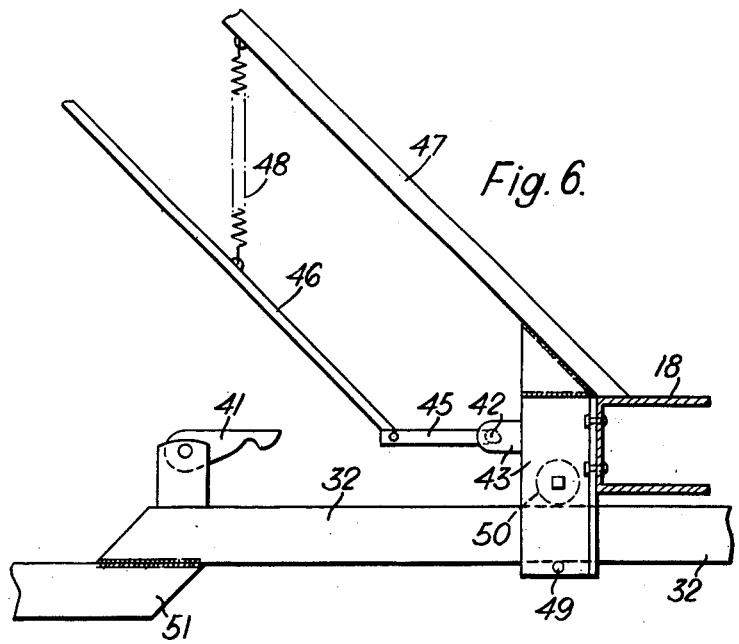
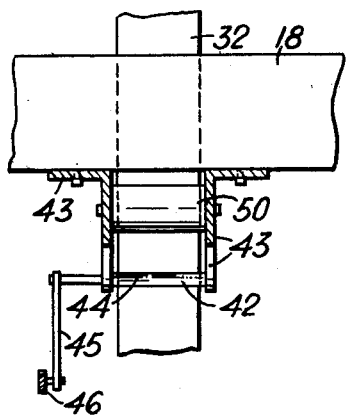
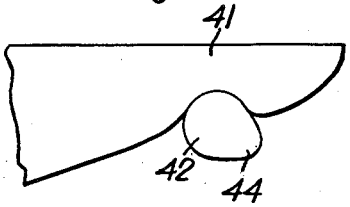
LANCELOT BARTON LOANE
Inventor.
By
Richardson, David and Nordon
Attorneys

United States Patent Office 3,057,663
Patented Oct. 9, 1962

3,057,663
LOAD-CARRYING APPARATUS
Lancelot Barton Loane, Clanabogan, Omagh, County
Tyrone, Northern Ireland
Filed Sept. 8, 1960, Ser. No. 54,654
7 Claims. (Cl. 298—24)

This invention relates to a load-carrying apparatus.

The present invention is a load-carrying apparatus comprising a wheeled hopper having a floor adapted to be moved forwardly and upwardly to unload the contents of the hopper.

Preferably, the rear wall of the hopper serves as a door and is pivoted at its top and is maintained closed by the floor so that movement of the latter causes the rear wall to swing open.

Preferably also, releasable locking means is provided to maintain the floor stationary.

Preferably also, the apparatus comprises a main frame supporting the hopper, the main frame having a pair of outwardly-directed stub axles for supporting ground-engaging wheels, whereby downward discharging of the load in the hopper is not obstructed.

Preferably also, the apparatus comprises a longitudinally-movable drawbar to which the floor is connected so that movement of the drawbar causes corresponding movement of the floor.

Preferably also, power means is provided to move the floor forwardly and upwardly. Such means may consist of a tractor.

An embodiment of the present invention will now be described, by way of example, with reference to the accompanying drawings, in which:

FIG. 1 is a side elevation of apparatus according to the present invention;

FIG. 2 is a plan view of the drawbar;

FIG. 3 is a plan view of the main frame;

FIGS. 4 and 5 are respectively a fragmentary side elevation and a transverse cross-section of the main frame and drawbar; and FIGS. 6, 7 and 8 are respectively a side elevation, a sectional plan view and a detail view of the releasable locking means.

Referring to the drawings, especially FIG. 1, the load-carrying apparatus consists of a trailer vehicle 15 including a main frame 16 (FIG. 3) constituted by a pair of laterally-spaced, longitudinal channel members 17 interconnected at one end, by a channel beam 18 and intermediate their ends by a beam 19. The other end of the channel members 17 is open and the channels thereof open upwardly to form guide runways. Each member 17 mounts, at its rear, an outwardly-directed stub axle 20 for rotatably supporting a ground-engaging wheel 21 (FIG. 1). It will clearly be seen that the construction of the main frame 16 and the employment of the stub axles 20 provide a clear base permitting a non-obstructed downward discharge of the apparatus load. The vehicle 15 also includes a hopper 22 comprising two side walls 23, a front wall 24, a rear wall 25 and a floor 26, all supported on the main frame 16 and suitably braced where necessary as indicated at 27.

The front wall 24 is at least at its upper part of perforated construction (wire mesh) to permit the contents of the hopper 22 to be viewed, and it is formed with a tranverse slot 28 intermediate its top and bottom within which is mounted adjacent the bottom thereof a freely-rotatable transverse roller 29.

The trailer vehicle 15 has a T-shaped drawbar 30 (FIG. 2) the crossbar 31 of the T being arranged at the rear of the vehicle with the stem 32 projecting forwardly of the front of the vehicle. Each end of the crossbar 31 mounts a rotatable small wheel 33 which runs in the adjacent longitudinal channel member 17 of the main frame 16. The crossbar 31 of the drawbar 30 also mounts, at each end, a downwardly-extending arm 34 adapted to abut the intermediate beam 19 of the main frame 16 and so limit movement of the drawbar 30 relative to the main frame 16. The arms 34 and beam 19, therefore, serve as complementary stops. The crossbar 31 is provided with brackets 35 for attachment to the floor 26, and with two rearwardly-projecting arms 36 which act as supports of the hopper rear wall 25.

The hopper floor 26, which in the present example is of straight construction although it may be curved, is movable and is secured, at its rear, to the brackets 35 of the crossbar 31 of the T-shaped drawbar 30 and rests freely, at its front, on the transverse roller 29 of the front wall 24, the front of the floor 26 projecting through the slot 28. The floor 26 and crossbar 31 may be connected by bolting, welding or any other suitable means, and they may be interconnected at their sides instead of, or in addition to, their centres, or they may be interconnected throughout their whole widths.

The rear wall 25 is tray shaped and serves as a door. It is pivoted at its top about a horizontal axis as indicated at 37 and the bottom of the rear wall 25, in its closed position, rests on the pair of arms 36 projecting rearwardly from the crossbar 31. As a result, when the drawbar 30 is moved forwardly, the rear wall 25 swings open automatically without the necessity of a worker opening same. The centre of gravity of the rear wall 25 is forward of the horizontal pivot axis 37. A pair of outwardly-movable, spring-loaded catches 38 are provided on the side walls 23 and are adapted to engage projections 40 on the rear wall 25 to assist in maintaining it closed. The projections 40 are constituted by the angle of the rear wall webs and the catches 38 are formed with shoulders to engage same.

Releasable locking means is provided to maintain the floor 26 and rear wall 25 in the closed position as shown in FIG. 1. This means comprises a locking clip 41 pivotal about a horizontal axis in a vertical plane and mounted on the stem 32 of the drawbar 30, a locking pin 42 secured to the beam 18 of the main frame 16 by a pair of brackets 43 and adapted to be engaged by the locking clip 41, and a manually-operable linkage system for disengaging the locking clip 41 from the locking pin 42. The locking pin 42 is rotatable and is provided with a nose or cam projection 44 (FIG. 8). The linkage system comprises a bar 45 connected, at one end, to the pin 42, and, at the other end, to a manually-operable lever 46 which is supported by an upwardly-inclined strut 47 rigid with the beam 18 at a location whereat it can easily be reached by the driver of a tractor (not shown) pulling the trailer vehicle 15. A spring 48 is connected between the strut 47 and the lever 46 to prevent the latter from inadvertently releasing the locking means.

When the lever 46 is pushed by a tractor driver the locking pin 42 is rotated and the nose 44 disengages the clip 41 from the pin 42. To engage the clip 41 and pin 42, the clip 41 is pushed against the pin 42 and it rides up over it until the recess thereof engages the pin 42.

In a modification the locking pin 42 is mounted on the drawbar 30, and the pivotal clip 41 is mounted on the main frame 16.

The brackets 43 mount a bolt 49 and a rotatable roller 50 between which the stem 32 of the drawbar 30 runs with the roller 50 on top. The roller 50 gives the drawbar 30 freedom of movement and serves to reduce friction.

In use the above described trailer vehicle 15 is hitched to the drawbar 51 of a tractor (not shown) by the drawbar 30 and is pulled to the desired locations by the latter.

When the trailer vehicle 15 is fully loaded and it is desired to unload the contents thereof, the linkage system is actuated to disengage the locking clip 41 and pin 42 as aforesaid and the tractor is driven slowly forwards. This action causes the drawbar 30 and the rear of the floor 26 to move forwardly of the trailer vehicle. The floor 26 is guided upwardly by the transverse roller 29 so that the floor 26 is pulled forwardly and upwardly until the complementary stops 34 and 19 contact each other, the load in the trailer vehicle falling out through the open bottom.

When the floor 26 begins its movement, the arms 36 on the drawbar 30 are withdrawn from under the rear wall 25 which falls open due to the weight of the load overcoming the spring-loaded catches 38.

When the stops 34 and 19 are engaged further movement of the tractor causes the trailer vehicle 15 to move forwardly so that the rear wall 25 moves away from the vehicle about its pivot 37 until it can slide up and over the discharged load, whereupon it will swing back towards its closed position until its centre of gravity is reached and the catches 38 engage the projections 40.

The tractor is then reversed to move the drawbar 30 and floor 26 back to their original positions whereupon the locking clip 41 and pin 42 are re-engaged.

The trailer vehicle can be used for conveying any suitable load.

Various modifications may be made without departing from the scope of the present invention as defined in the accompanying claims.

For example, the drawbar may be moved by rams, a winch or any other suitable power means.

The hopper may be of dismantleable construction so that it can easily and readily be dismantled for transport or cleaning purposes and then re-assembled again.

I claim:

1. A load carrying apparatus comprising a wheeled frame, a hopper mounted on the frame, a hopper floor slidable forwardly relative to the body between a closed, load-carrying position and an open load-dumping position, means for releasably locking the floor in its closed, load-carrying position, and a longitudinally slidable drawbar connected to the hopper floor and slidable forwardly relative to the hopper, when the locking means is released, simultaneously to pull the hopper floor forwardly to its open, load-dumping position.

2. A load carrying apparatus comprising a wheeled frame, a hopper mounted on the frame, a forwardly and upwardly inclined hopper floor slidable through a slot provided therefor at the hopper front relative to the body between a closed, load-carrying position and an open load-dumping position, means for releasably locking the floor in its closed, load-carrying position, and a longitudinally slidable drawbar connected to the hopper floor and slidable forwardly relative to the hopper, when the locking means is released, simultaneously to pull the hopper floor forwardly to its open, load-dumping position.

3. A load carrying apparatus comprising a wheeled frame, a hopper mounted on the frame, a forwardly and upwardly inclined hopper floor slidable through a slot provided therefor at the hopper front relative to the body between a closed, load-carrying position and an open load-dumping position, means for releasably locking the floor in its closed, load-carrying position, a longitudinally slidable drawbar connected to the hopper floor and slidable forwardly relative to the hopper, when the locking means is released, simultaneously to pull the hopper floor forwardly to its open, load-dumping position, and complementary stop means on the drawbar and frame to limit the forward movement of the drawbar and hopper floor.

4. A load carrying apparatus comprising a wheeled frame, a hopper mounted on the frame, the hopper being open at the rear, a rear hopper wall serving as a door and pivotal about a horizontal axis at its top, a forwardly and upwardly inclined hopper floor slidable through a slot provided therefor at the hopper front relative to the body between a closed, load-carrying position and an open load-dumping position, means for releasably locking the floor in its closed, load-carrying position, a longitudinally slidable drawbar connected to the hopper floor and slidable forwardly relative to the hopper, when the locking means is released, simultaneously to pull the hopper floor forwardly to its open, load-dumping position, and complementary stop means on the drawbar and frame to limit the forward movement of the drawbar and hopper floor.

5. A load carrying apparatus comprising a wheeled frame, a hopper mounted on the frame, the hopper being open at the rear, a rear hopper wall serving as a door and pivotal about a horizontal axis at its top between closed and open positions, a forwardly and upwardly inclined hopper floor slidable through a slot provided therefor at the hopper front relative to the body between a closed, load-carrying position and an open load-dumping position, means for releasably locking the floor in its closed, load-carrying position, a longitudinally slidable drawbar connected to the hopper floor and slidable forwardly relative to the hopper, when the locking means is released, simultaneously to pull the hopper floor forwardly to its open, load-dumping position, complementary stop means on the drawbar and frame to limit the forward movement of the drawbar and hopper floor, and at least one rearwardly-directed arm connected to the drawbar and on which the bottom of the rear wall rests when it and the floor are in their closed position.

6. A load carrying apparatus comprising a wheeled frame including a pair of outwardly-directed stub axles, a ground-engaging wheel rotatably mounted on each stub axle, a hopper mounted on the frame, the hopper being open at the rear, a rear hopper wall serving as a door and pivotal about a horizontal axis at its top between closed and open positions, a forwardly and upwardly inclined hopper floor slidable through a slot provided therefor at the hopper front relative to the body between a closed, load-carrying position and an open load-dumping position, means for releasably locking the floor in its closed, load-carrying position, a longitudinally slidable drawbar connected to the hopper floor and slidable forwardly relative to the hopper, when the locking means is released, simultaneously to pull the hopper floor forwardly to its open, load-dumping position, complementary stop means on the drawbar and frame to limit the forward movement of the drawbar and hopper floor, and at least one rearwardly-directed arm connected to the drawbar and on which the bottom of the rear wall rests when it and the floor are in their closed position.

7. A load carrying apparatus comprising a wheeled frame including a pair of outwardly-directed stub axles, a ground-engaging wheel rotatably mounted on each stub axle, a hopper mounted on the frame, the hopper being open at the rear, a rear hopper wall serving as a door and pivotal about a horizontal axis at its top, a forwardly and upwardly inclined hopper floor slidable through a slot provided therefor at the hopper front relative to the body between a closed, load-carrying position and an open load-dumping position, means for releasably locking the floor in its closed, load-carrying position, a longitudinally slidable drawbar connected to the hopper floor and slidable forwardly relative to the hopper, when the locking means is released, simultaneously to pull the hopper floor forwardly to its open, load-dumping position, complementary stop means on the drawbar and frame to limit the forward movement of the drawbar and hopper floor, at least one rearwardly-directed arm connected to the drawbar and on which the bottom of the rear wall rests when it and the floor are in their closed position, and said locking means comprising a pivotal clip on the drawbar, a locking pin on the frame and engageable by the clip, and manually-operable linkage means for disengaging the pin and clip to permit dumping of the load.

References Cited in the file of this patent

UNITED STATES PATENTS

| | | |
|---|---|---|
| 879,412 | Potter | Feb. 18, 1908 |
| 1,296,562 | Schlaegel | Mar. 2, 1919 |
| 1,969,933 | LeTourneau | Aug. 14, 1934 |